United States Patent
Sacco et al.

(10) Patent No.: US 12,189,679 B2
(45) Date of Patent: *Jan. 7, 2025

(54) ITEM IDENTIFICATION FOR ITEM COLLECTION MANAGEMENT

(71) Applicant: eBay Inc., San Jose, CA (US)

(72) Inventors: Nathan Sacco, Los Gatos, CA (US); Guy Schory, San Francisco, CA (US); Robert Dean Veres, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,759

(22) Filed: Jul. 26, 2023

(65) Prior Publication Data

US 2023/0367807 A1    Nov. 16, 2023

Related U.S. Application Data

(63) Continuation of application No. 17/553,478, filed on Dec. 16, 2021, now abandoned, which is a continuation of application No. 16/364,722, filed on Mar. 26, 2019, now Pat. No. 11,222,065, which is a continuation of application No. 15/920,134, filed on Mar. 13, 2018, now Pat. No. 10,289,697, which is a continuation of application No. 13/289,928, filed on Nov. 4, 2011, now Pat. No. 9,946,730.

(51) Int. Cl.
*G06F 16/583*    (2019.01)
*G06Q 10/08*    (2023.01)

(52) U.S. Cl.
CPC .......... *G06F 16/583* (2019.01); *G06Q 10/08* (2013.01)

(58) Field of Classification Search
None
See application file for complete search history.

(56) References Cited

U.S. PATENT DOCUMENTS

| | | | |
|---|---|---|---|
| 7,127,458 B1 * | 10/2006 | Mantripragada | ............................ G06F 16/90344 |
| 7,344,080 B2 | 3/2008 | Vinogradov et al. | |
| 7,933,818 B1 * | 4/2011 | Kumar | .................... G06F 16/14 |
| 8,438,084 B1 * | 5/2013 | Tesler | ..................... G06F 16/58 |
| 8,458,054 B1 | 6/2013 | Thakur | |
| 8,725,595 B1 * | 5/2014 | Siegel | ..................... G06F 16/95 |
| 9,946,730 B2 | 4/2018 | Sacco et al. | |
| 10,289,697 B2 | 5/2019 | Sacco et al. | |

(Continued)

OTHER PUBLICATIONS

U.S. Appl. No. 13/289,928, "Appeal Brief for U.S. Appl. No. 13/289,928, filed Aug. 23, 2016", filed Aug. 23, 2016, 21 Pages.

(Continued)

*Primary Examiner* — Son T Hoang
(74) *Attorney, Agent, or Firm* — FIG. 1 Patents

(57) ABSTRACT

A networked system receives, from a device of a user, a selection of an item from a list for monitoring. The network system also receives, from the device of the user, a condition that triggers the reporting of news for the selected item. The network system monitors for news for the selected item. A determination is made as to whether the condition that triggers the reporting of the news is satisfied. In response to determining that the condition that triggers the reporting of the news is satisfied, the networked system transmits a notification to the user indicating the news for the selected item.

18 Claims, 8 Drawing Sheets

(56) References Cited

U.S. PATENT DOCUMENTS

| | | | |
|---|---|---|---|
| 11,222,065 | B2 | 1/2022 | Sacco et al. |
| 2002/0032634 | A1 | 3/2002 | Abrams et al. |
| 2002/0049839 | A1 | 4/2002 | Miida et al. |
| 2002/0069156 | A1* | 6/2002 | Adam .................. G06F 16/583 |
| 2002/0082977 | A1 | 6/2002 | Hammond et al. |
| 2002/0084330 | A1 | 7/2002 | Chiu |
| 2004/0015950 | A1* | 1/2004 | Dutta ..................... G06F 16/13 |
| 2005/0234801 | A1 | 10/2005 | Zhang et al. |
| 2008/0077511 | A1 | 3/2008 | Zimmerman |
| 2008/0147566 | A1* | 6/2008 | Malik ................... G06F 16/904 |
| 2009/0030789 | A1 | 1/2009 | Mashinsky |
| 2009/0094260 | A1* | 4/2009 | Cheng .................... G06F 16/95 |
| 2009/0116695 | A1 | 5/2009 | Anchyshkin et al. |
| 2009/0160856 | A1* | 6/2009 | Hoguet ................. G06F 16/904 |
| 2009/0240735 | A1 | 9/2009 | Grandhi et al. |
| 2010/0324968 | A1 | 12/2010 | Schoettle |
| 2012/0056720 | A1 | 3/2012 | Barvick et al. |
| 2013/0117269 | A1 | 5/2013 | Sacco et al. |
| 2015/0254759 | A1* | 9/2015 | Varadarajan ............ G06F 16/54 |
| 2018/0203876 | A1 | 7/2018 | Sacco et al. |
| 2019/0220480 | A1 | 7/2019 | Sacco et al. |
| 2022/0107976 | A1 | 4/2022 | Sacco et al. |

OTHER PUBLICATIONS

U.S. Appl. No. 13/289,928, "Appeal-Brief for U.S. Appl. No. 13/289,928, filed Mar. 12, 2015", filed Mar. 12, 2015, 20 Pages.

U.S. Appl. No. 13/289,928, "Final Office Action received for U.S. Appl. No. 13/289,928, mailed on Mar. 28, 2013", Mar. 28, 2013, 15 Pages.

U.S. Appl. No. 13/289,928, "Final Office Action received for U.S. Appl. No. 13/289,928, mailed on Sep. 12, 2014", Sep. 12, 2014, 18 Pages.

U.S. Appl. No. 13/289,928, "Non-Final Office Action received for U.S. Appl. No. 13/289,928, mailed on Aug. 16, 2017", Aug. 16, 2017, 30 Pages.

U.S. Appl. No. 13/289,928, "Non-Final Office Action received for U.S. Appl. No. 13/289,928, mailed on Dec. 20, 2012", Dec. 20, 2012, 14 Pages.

U.S. Appl. No. 13/289,928, "Non-Final Office Action received for U.S. Appl. No. 13/289,928, mailed on Jul. 24, 2015", Jul. 24, 2015, 20 Pages.

U.S. Appl. No. 13/289,928, "Non-Final Office Action received for U.S. Appl. No. 13/289,928, mailed on Mar. 26, 2014", Mar. 26, 2014, 17 Pages.

U.S. Appl. No. 13/289,928, "Notice of Allowance Received for U.S. Appl. No. 13/289,928, mailed on Dec. 8, 2017", Dec. 8, 2017, 10 Pages.

U.S. Appl. No. 15/920,134, "Non-Final Office Action received for U.S. Appl. No. 15/920,134, mailed on Aug. 16, 2018", Aug. 16, 2018, 14 Pages.

U.S. Appl. No. 15/920,134, "Notice of Allowance received for U.S. Appl. No. 15/920,134, mailed on Jan. 3, 2019", Jan. 3, 2019, 19 Pages.

U.S. Appl. 15/920,134, "Preliminary Amendment for U.S. Appl. No. 15/920,134 filed on Mar. 14, 2018", Mar. 14, 2018, 8 Pages.

U.S. Appl. No. 16/364,722, "Final Office Action Received for U.S. Appl. No. 16/364,722, mailed on Jun. 24, 2021", Jun. 24, 2021, 24 Pages.

U.S. Appl. No. 16/364,722, "Non-Final Office Action Received for U.S. Appl. No. 16/364,722, mailed on Sep. 18, 2020", Sep. 18, 2020, 21 Pages.

U.S. Appl. No. 16/364,722, "Notice of Allowance Received for U.S. Appl. No. 16/364,722, mailed on Sep. 7, 2021", Sep. 7, 2021, 12 Pages.

U.S. Appl. No. 17/553,478, "Non-Final Office Action Received for U.S. Appl. No. 17/553,478, mailed on Feb. 15, 2023", Feb. 15, 2023, 24 Pages.

U.S. Appl. No. 17/553,478, "Notice of Allowance", U.S. Appl. No. 17/553,478, May 23, 2023, 12 pages.

\* cited by examiner

ITEM IDENTIFICATION FOR ITEM COLLECTION MANAGEMENT

RELATED APPLICATIONS

This application is a continuation of U.S. patent application Ser. No. 17/553,478, filed Dec. 16, 2021, which is a continuation of and claims the benefit of priority to U.S. patent application Ser. No. 16/364,722, filed Mar. 26, 2019, which is a continuation of and claims the benefit of priority to U.S. patent application Ser. No. 15/920,134, filed Mar. 13, 2018, now U.S. Pat. No. 10,289,697, which is a continuation of and claims the benefit of priority to U.S. patent application Ser. No. 13/289,928, now U.S. Pat. No. 9,946,730, entitled "SYSTEM AND METHOD FOR ONBOARDING AN ITEM COLLECTION," filed on Nov. 4, 2011, the disclosures of which are hereby incorporated by reference in their entireties.

FIELD

The present disclosure relates generally to data management, and in a specific example embodiment, to onboarding and managing an item collection.

BACKGROUND

Conventionally, an individual may manually create an inventory list of a collection of items. This may require the individual to physically compile the collection of items and manually enter data pertaining to each item of the collection of items. The manually entered data may then be organized and saved. Such manual entry may result in human errors and is time consuming.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a marketplace environment, the embodiments are given merely for clarity in disclosure. Thus, any type of electronic publication, electronic commerce, social networking, or electronic business system and method, including various system architectures, may employ various embodiments of the system and method described herein and may be considered as being within a scope of example embodiments. Each of a variety of example embodiments is discussed in detail below.

Example embodiments described herein provide systems and methods for onboarding a collection of items. Onboarding, in the context of example embodiments, refers to the inventorying of a collection of items into a system which allows the user to easily manage, update, and utilize inventory information of a maintained inventory list.

In various example embodiments, a system and method for onboarding a collection of items is provided. In example embodiments, image data containing images of a plurality of items is received from a client device. The image data is parsed to distinguish an item of the plurality of items. The item is then identified. In some embodiments, the item is identified by determining at least one catalog item that matches an identifying feature of the item, providing a verification request indicating the at least one catalog item, and receiving a verification response confirming the identity of the item. An inventory list is compiled by including the identified item in the inventory list.

By using embodiments of the present invention, a user may easily, efficiently, and expeditiously onboard a collection of items in an automated manner. Because the user does not need to manually enter information for each item in the collection, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

Figure 1:
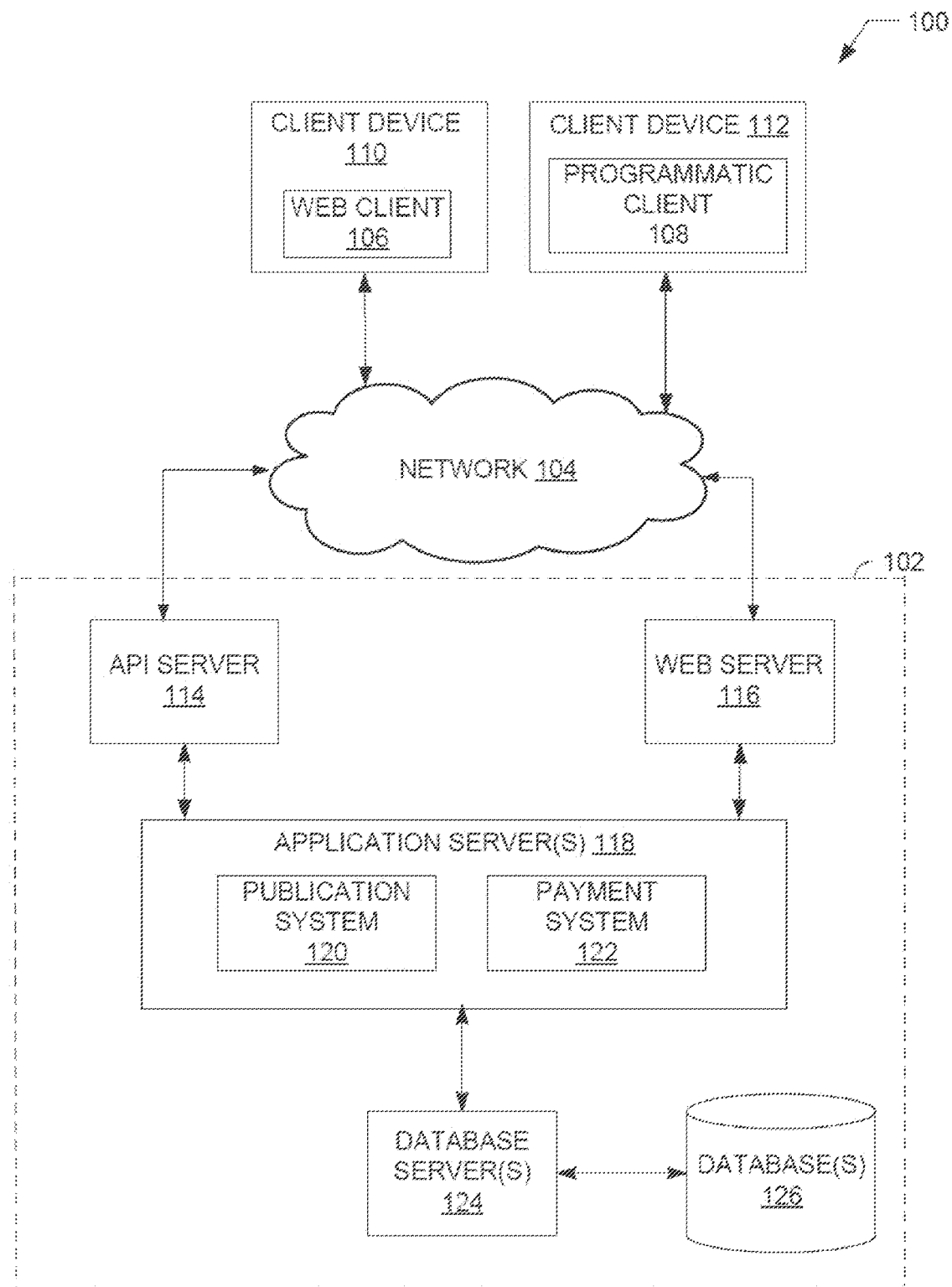
FIG. 1 is a block diagram illustrating an example embodiment of a network architecture of a system used to determining query aspects.

With reference to FIG. 1, an example embodiment of a high-level client-server-based network architecture 100 to enable onboarding of a collection of items and subsequent usage of generated inventory information is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Washington State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise or be connectable to an image capture device (e.g., camera, camcorder). In further embodiments, the client device 110 may comprise one or more of a touch screen, accelerometer, microphone, and GPS device. Each of the client devices 110 and 112 may be a device of an individual user having one or more collections of items to be onboarded.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store and maintain inventory information resulting from the onboarding of the collections of items as well as information posted to the publication system 120. The databases 126 may also store user account information of the networked system 102 in accordance with example embodiments.

In example embodiments, the publication system 120 publishes content on a network (e.g., Internet). As such, the publication system 120 provides a number of publication functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment such as an informational or social networking environment.

The payment system 122 provides a number of payment services and functions to users. The payment system 122 allows users to accumulate value (e.g., in a commercial currency, such as the U.S. dollar, or a proprietary currency, such as "points") in their accounts, and then later to redeem the accumulated value for products (e.g., goods or services) that are made available via the publication system 120 or elsewhere on the network 104. The payment system 122 also facilitates payments from a payment mechanism (e.g., a bank account, PayPal™, or credit card) for purchases of items via any type and form of a network-based marketplace.

While the publication system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
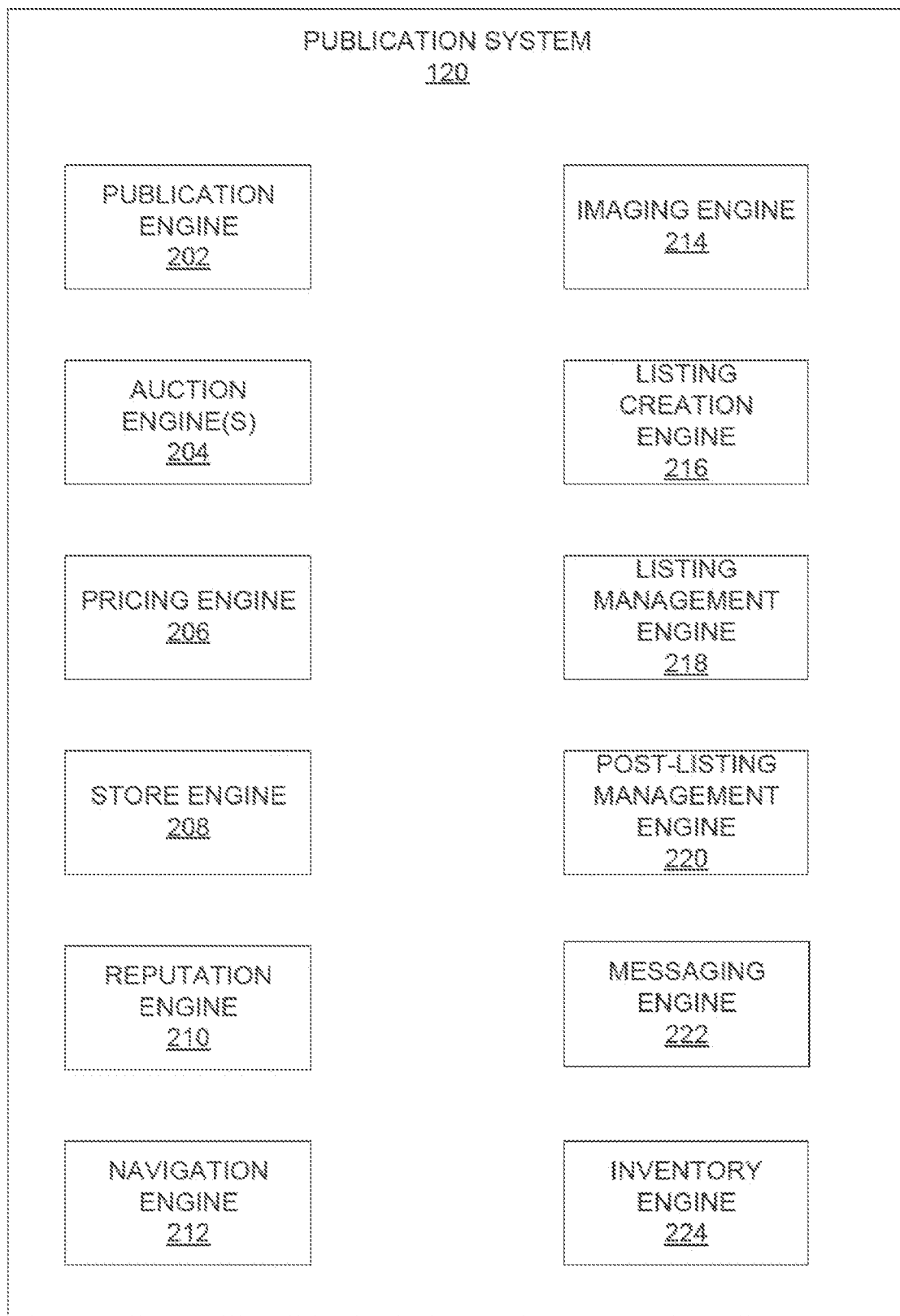
FIG. 2 is a block diagram illustrating an example embodiment of a publication system.

Referring now to FIG. 2, an example block diagram illustrating multiple components that, in one embodiment, are provided within the publication system 120 of the networked system 102 is shown. In this embodiment, the publication system 120 is a marketplace system where items (e.g., goods or services) may be offered for sale. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources to allow information to be passed between the components or to allow the components to share and access common data. Furthermore, the components may access the one or more databases 126 via the one or more database servers 124.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.).

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, California) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the publication system 120 supports person-to-person trading between unknown entities, in accordance with one embodiment, users may otherwise have no history or other reference information whereby the trustworthiness and credibility of potential trading partners may be assessed. The reputation engine 210 allows a user, for example through feedback provided by one or more other transaction partners, to establish a reputation within the network-based marketplace over time. Other potential trading partners may then reference the reputation for purposes of assessing credibility and trustworthiness. In alternative embodiments, the reputation score may be based on feedback not related to trades or transactions (e.g., recommendations from others, number of connections).

Navigation of the network-based publication system may be facilitated by a navigation engine 212. For example, a search module (not shown) of the navigation engine 212 enables, for example, keyword searches of listings or other information published via the publication system 120. In a further example, a browse module (not shown) of the navigation engine 212 allows users to browse various category, catalog, or data structures according to which listings or other information may be classified within the publication system 120. Various other navigation applications within the navigation engine 212 may be provided to supplement the searching and browsing applications.

In order to make listings or posting of information available via the networked system 102 as visually informing and attractive as possible, the publication system 120 may include an imaging engine 214 that enables users to upload images for inclusion within listings and to incorporate images within viewed listings. In some embodiments, the imaging engine 214 also receives image data from a user and utilizes the image data to identify an item depicted or described by the image data. For example, the imaging engine 214 may receive an image (e.g., picture, video) of a collection of items to be onboarded. The imaging engine 214 may work in conjunction with the inventory engine 224 to identify items in the image as will be discussed in more detail below.

A listing creation engine 216 allows users to conveniently author listings of items. In one embodiment, the listings pertain to goods or services that a user (e.g., a seller) wishes to transact via the publication system 120. In other embodiments, a user may create a listing that is an advertisement or other form of publication to the networked system 102. For example, a listing may comprise information for an item that is onboarded, which the user wants to share with, or offer for sale to, other individuals in an online community.

A listing management engine 218 allows users to manage such listings. Specifically, where a particular user has authored or published a large number of listings, the management of such listings may present a challenge. The listing management engine 218 provides a number of features (e.g., auto-relisting, inventory level monitors, etc.) to assist the user in managing such listings.

A post-listing management engine 220 also assists users with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210. Another post-listing action may be shipping of sold items whereby the post-listing management engine 220 may assist in printing shipping labels, estimating shipping costs, and suggesting shipping carriers.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

An inventory engine 224 manages the onboarding of a collection of items and subsequent management and usage of inventory information generated from the onboarded items. The inventory engine 224 will be discussed in more detail in connection with FIG. 3 below.

Although the various components of the publication system 120 have been defined in terms of a variety of individual modules and engines, a skilled artisan will recognize that many of the items can be combined or organized in other ways. Furthermore, not all components of the marketplace system 120 have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3:
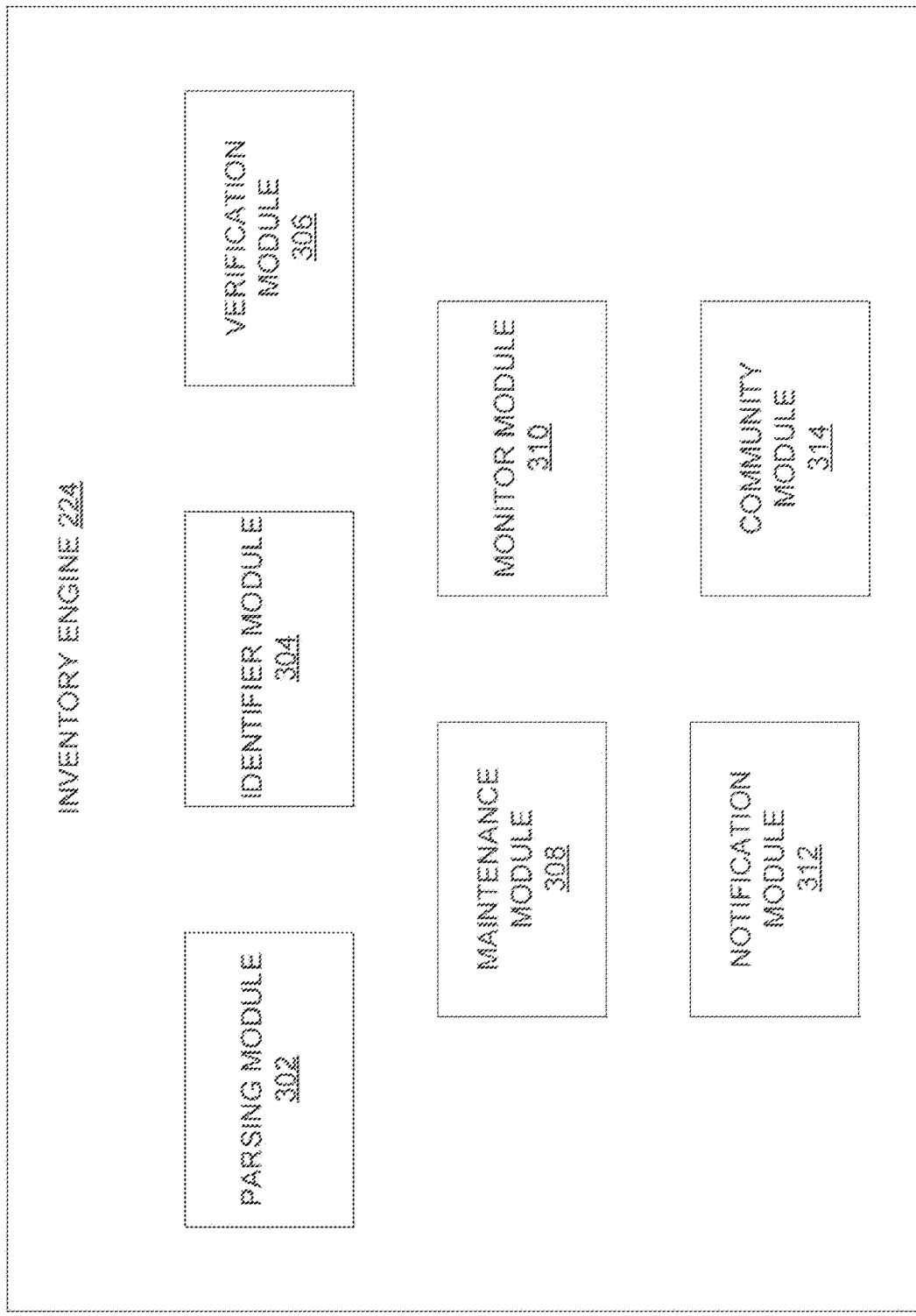
FIG. 3 is a block diagram illustrating an example embodiment of an inventory engine.

FIG. 3 is a block diagram illustrating an example embodiment of the inventory engine 224. The inventory engine 224 manages the onboarding of a collection of items and subsequent management and usage of inventory information generated from the onboarded items. In example embodiments, the inventory engine 224 comprises a parsing module 302, an identifier module 304, a verification module 306, a maintenance module 308, a monitor module 310, a notification module 312, and a community module 314. In alternative embodiments, one or more of the modules of the inventory engine 224 may be located elsewhere in the networked system 102 (e.g., the imaging engine 214).

In example embodiments, the imaging engine 214 may receive image data (e.g., photo, video) from the client device 110. The imaging data is then provided to the parsing module 302 for processing. The parsing module 302 parses the image data to distinguish between multiple items in the image data. For example, if the imaging data is a video stream of a collection of DVDs located on a shelf, the parsing module 302 parses the image data to determine each individual item (e.g., DVD) on the shelf. In one embodiment, the parsing module 302 may use edge detection processing to determine an outline or shape for each item. Other techniques for distinguishing individual items of the image data may be contemplated.

Each parsed item is then identified by the identifier module 304. In example embodiments, the identifier module 304 analyzes each item to determine an identifying feature such as a name, title, product number, or any other identifying feature for the item that distinguished the item from other items. The identifier module 304 may use one or more of OCR, image recognition, text recognition, barcode identification (if a barcode is visible in the image), and pattern recognition to determine identifying features of the item (e.g., title, barcode, UPC code, words on the item, images on the item). In example embodiments, the identifier module 304 may access a catalog of items (e.g., stored in the database 126) to determine one or more potential matches that correspond to the identifying features of the item. For example, a DVD may be analyzed by the identifier module 304 using OCR (optical character recognition) to determine a potential title for the DVD. A catalog of DVD titles may then be referenced to determine one or more DVD titles that may match the potential title. Alternatively, a barcode of the DVD, if visible, may be read by the identifier module 304 and a barcode catalog may be accessed to determine a match for the barcode.

The verification module 306 receives verification by the user that the item is correctly identified. In example embodiments, the verification module 306 takes the matches obtained from referencing an item catalog with the identifying features of the item and presents the matches to the user. In instances where only one match is found, the user is requested to indicate whether the match is correct. If the match is not correct, the user may be allowed to enter correct information for the item. In examples where there are multiple matches found, the user is requested to select the correct match or to supply correct information if none of the matches are correct.

Once verification is received, the maintenance module 308 populates an inventory list with the identified item. If the user has an existing list, the maintenance module 308 appends the new item information to the existing list. However, if the user does not have an existing list or wants to create a different inventory list, the maintenance module 308 will create a new inventory list for the user. Additionally, any corresponding information that is available from the item catalog for the identified item may be included in the inventory list or, alternatively, be referenced to (e.g., with a pointer) in the inventory list. The inventory list may be locally stored and maintained at the client device 110, stored at the database 126, or be stored at both locations.

The maintenance module 308 also allows the user to select actions to be performed with one or more of the items in the inventory list. For example, the user may indicate that a trend with respect to an indicated item should be determined, that an item should be monitored, that notifications with respect to an item be provided and conditions set for the presentation of the notifications, or that items may be published to an online community. Any type of action that may be performed using the items, once identified, may be contemplated.

The monitor module 310 monitors information for a selected item. In one embodiment, the monitor module 310 determines a trend for the item and provides information regarding the trend to the user when requested or upon a change in the trend. The trend may be, for example, a pricing trend, a supply trend, a demand trend, or a popularity trend. Accordingly, the monitor module 310 may access historical information from the publication system 120 and determine over a predetermined period of time the pricing, supply, demand, or popularity trends for the selected item. The resulting information may be provided to the user by the notification module 312.

Furthermore, the monitor module 310 may monitor the publication system 120 for activities involving the same items as the selected item. If a sudden change in price, supply, or demand is detected for the selected item, the notification module 312 may send out an alert to the user regarding the sudden change. The alert may also indicate that due to the change, it may be a good time for the user to sell the selected item. In this situation, the user may use the listing creation engine 216 to create a listing for the item. In one example, the item may be auto-listed. That is, since the maintenance module 308 has access to the catalog information for the item, the listing creation engine 216 can generate a listing using the catalog information, which only needs user approval to be published to the publication system 120. For example, a particular item may suddenly become popular or have a higher demand (e.g., more searches are performed to find the item on the publication system 120). A notification may be sent to the user indicating that due to the high demand for the item, the user may want to consider selling the item. Pricing trends for the item may also be provided so that the user may have an idea at what price to list the item. Alternatively, other trends may be provided to the user by the monitor module 310 such as supply and demand trends.

In an alternative example, the monitor module 310 may monitor the publication system 120 or the network at large for news regarding the selected item. The news may include upgrades available, plans for new versions or models of the selected item, or any other information that may be determined to be relevant regarding the selected item. The news may be obtained by the monitor module 310 using various techniques such as, for example, using web searches or web crawlers. Once relevant information is determined, the information may be forwarded to the user via the notification module 312. The user may establish conditions as to relevancy such that insignificant news may not be reported or is reported at a less immediate time (e.g., insignificant news may be collected and provided once a week).

The community module 314 manages communities of users that have similar inventory lists. In one embodiment, the community is a collector community whereby members collect similar items (e.g., same category type of items such as stamps, coins, comic books). Within the community, members may search published listings of other members, ask questions, discuss items, or make offers to purchase, exchange, trade, or sell items. In some cases, members may register with the community via the community module 314. It is noted that the community may be the network at large. Operations involving the community will be discussed in more detail in connection with FIG. 7 below.

Figure 4:
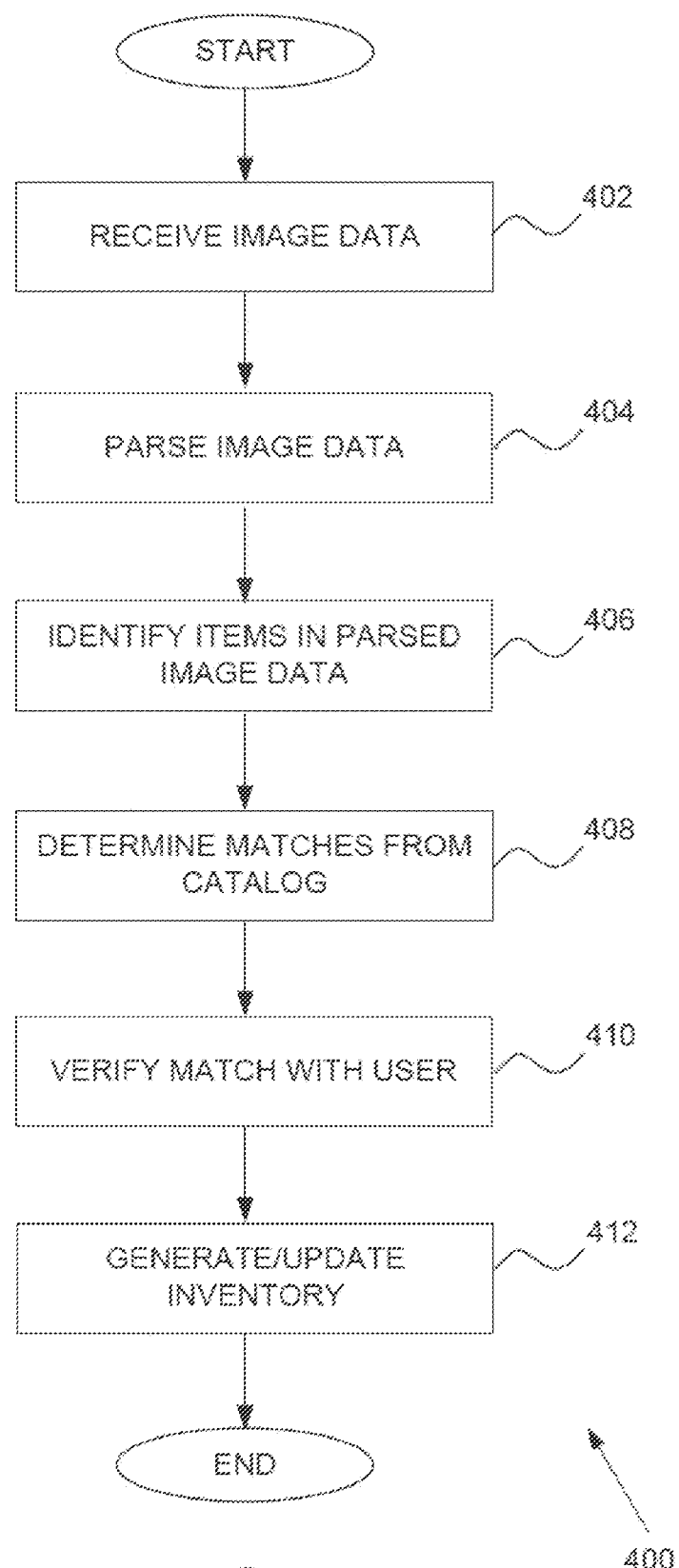
FIG. 4 is a flow diagram of an example high-level method for onboarding a collection of items.

FIG. 4 is a flow diagram of an example high-level method 400 for onboarding a collection of items. In example embodiments, a user uses an image capturing device (e.g., still or video camera) to capture image data of a collection of items. In one embodiment, the capturing device may be a camera of a mobile device such as a smartphone. The image is sent from user device 110 to the publication system 120. The image data is received in operation 402 by the imaging engine 214.

The image data is parsed in operation 404 by the parsing module 302 to distinguish between multiple items in the image data. In one embodiment, the parsing module 302 may use edge detection processing to determine an outline or shape for each item. Other techniques for distinguishing individual items of the image data, as known to one skilled in the art, may be contemplated. For example, if the imaging data is a photo of a collection of stamps, the parsing module 302 parses the image data to distinguish each individual stamp located in the image data.

Each parsed item is then identified in operation 406. In example embodiments, the identifier module 304 analyzes each parsed item to determine a name, title, product number, or any other identifying feature for the item. The identifier module 304 may use one or more of OCR, image recognition, text recognition, barcode scanning (if a barcode is visible in the image), and pattern recognition to determine identifying features of the item. Continuing with the stamp example, text recognition may determine a title or word (e.g., country, denomination) on the stamp. Alternatively or in addition, pattern or image recognition may be applied to determine an image on the stamp as well as colors, watermarks, or other visual features of the stamp.

In operation 408, one or more matches from a catalog are determined for the identified item. In example embodiments, the identifier module 304 may access a catalog of items (e.g., stored in the database 126) to determine one or more potential matches that correspond to the identifying features of the item. In the stamp example, a stamp catalog may be referenced to determine one or more stamps that may match the identified stamp based on the identifying feature.

In operation 410, the verification module 306 verifies a match. In example embodiments, the verification module 306 takes the matches obtained by referencing the item catalog with the identified item and presents the matches to the user (e.g., in a notification such as an e-mail or on a user interface). In instances where only one match is found, the user is requested to confirm whether the match is correct. If the match is not correct, the user may be allowed to enter correct information for the item. In examples where there are multiple matches found, the user is asked to select the correct match or to supply correct information if none of the matches are correct.

Once verification is received, an inventory list is generated or updated in operation 412. In example embodiments, the maintenance module 308 populates an inventory list with the matched item. If the user has an existing list, the maintenance module 308 appends the new item information to the existing list. Alternatively, if the user does not have an existing list or wants to create a different inventory list, the maintenance module 308 will create a new inventory list for the user. Additionally, any corresponding information that is available from the catalog for the identified item may be included in the inventory list or, alternatively, be referenced to (e.g., with a pointer) in the inventory list. The inventory list may then be stored.

Figure 5:
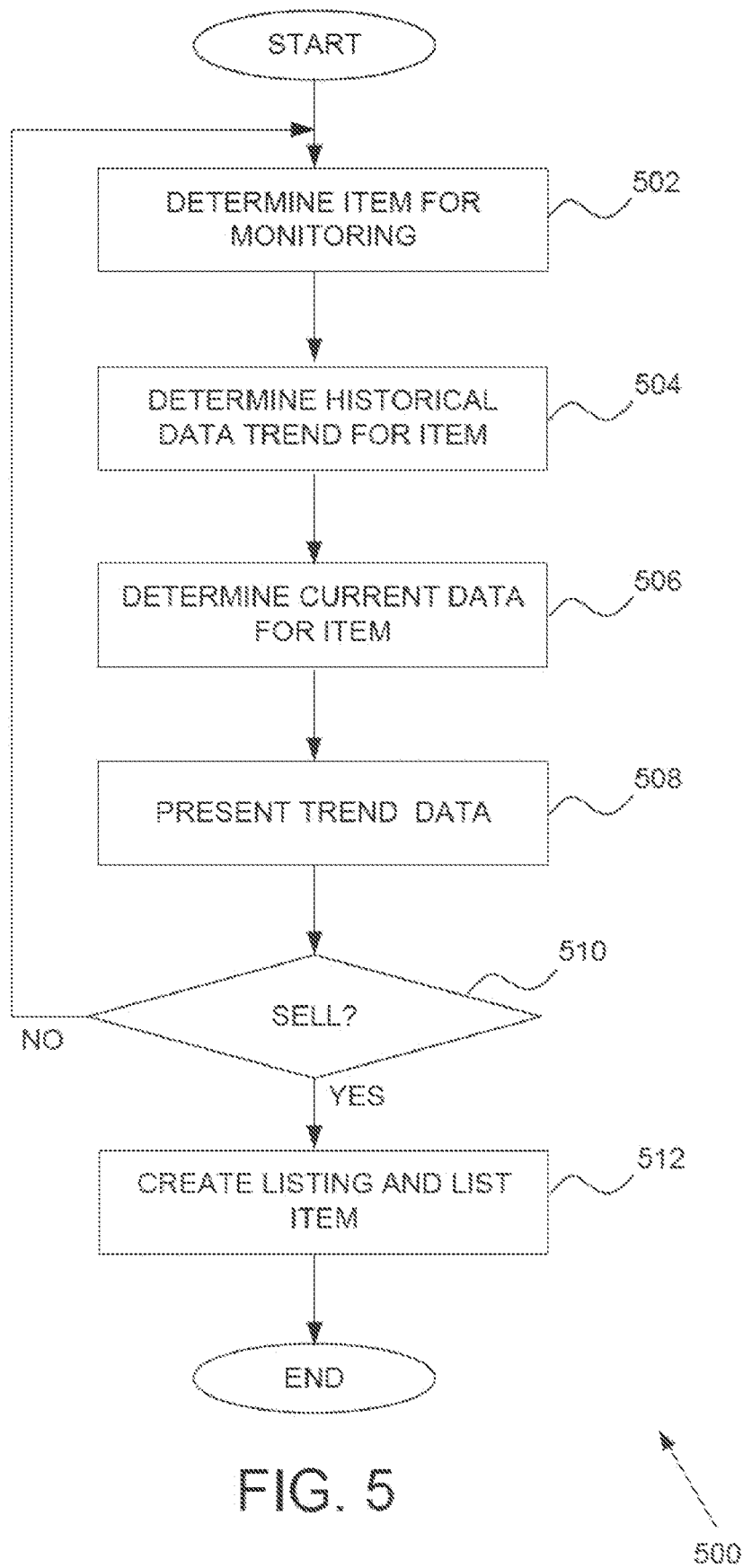
FIG. 5 is a flow diagram of an example high-level method for providing trend data for an onboarded item.

FIG. 5 is a flow diagram of an example high-level method 500 for providing trend data for an onboarded item. In example embodiments, a user may select an item from their inventory to monitor for trends and provide conditions to trigger the monitoring and reporting of the trends. In operation 502, the monitor module 310 determines the item for monitoring. For example, an indication may be provided in the inventory list that indicates conditions for monitoring the item (e.g., how often to be checked, when information should be reported to the user, amount of change in trend to trigger reporting of information).

In operation 504, a historical data trend for the information is determined by the monitor module 310. In one embodiment, the monitor module 310 may access historical data (e.g., past transaction data involving the same item) from the publication system 120 and determine over a predetermined period of time the pricing, supply, demand, or popularity trends for the selected item.

In operation 506, current data for the item is determined by the monitor module 310. The monitor module 310 accesses the publication system 120 and find data for the same item. For example, the monitor module 310 may review a plurality of listings for the same item on the publication system 120. A number of available items, average price, a price range, and other current data may be gleaned for selected item. The resulting historic and current data (e.g., collectively referred to as "trend data") for the selected item may be provided to the user by the notification module 312 in operation 508.

In some embodiments, the trend data may persuade the user to sell the item. In operation 510, a determination is made as to whether instructions to sell the item are received by the monitor module 310. For example, the trend data may indicate that demand for the item has recently increased and that the price is now high. In this situation, the user may decide to sell the item.

In operation 512, a listing may be created for the item and published to the publication system 120. In one embodiment, the listing creation engine 216 creates the listing for the item. In one example, the item may be auto-listed whereby catalog information for the item is retrieved and used to generate the listing. The user may review, edit, and approve this listing. Alternatively, the user may create the listing without the use of the catalog data. The publication engine 202 then publishes the approved listing.

Figure 6:
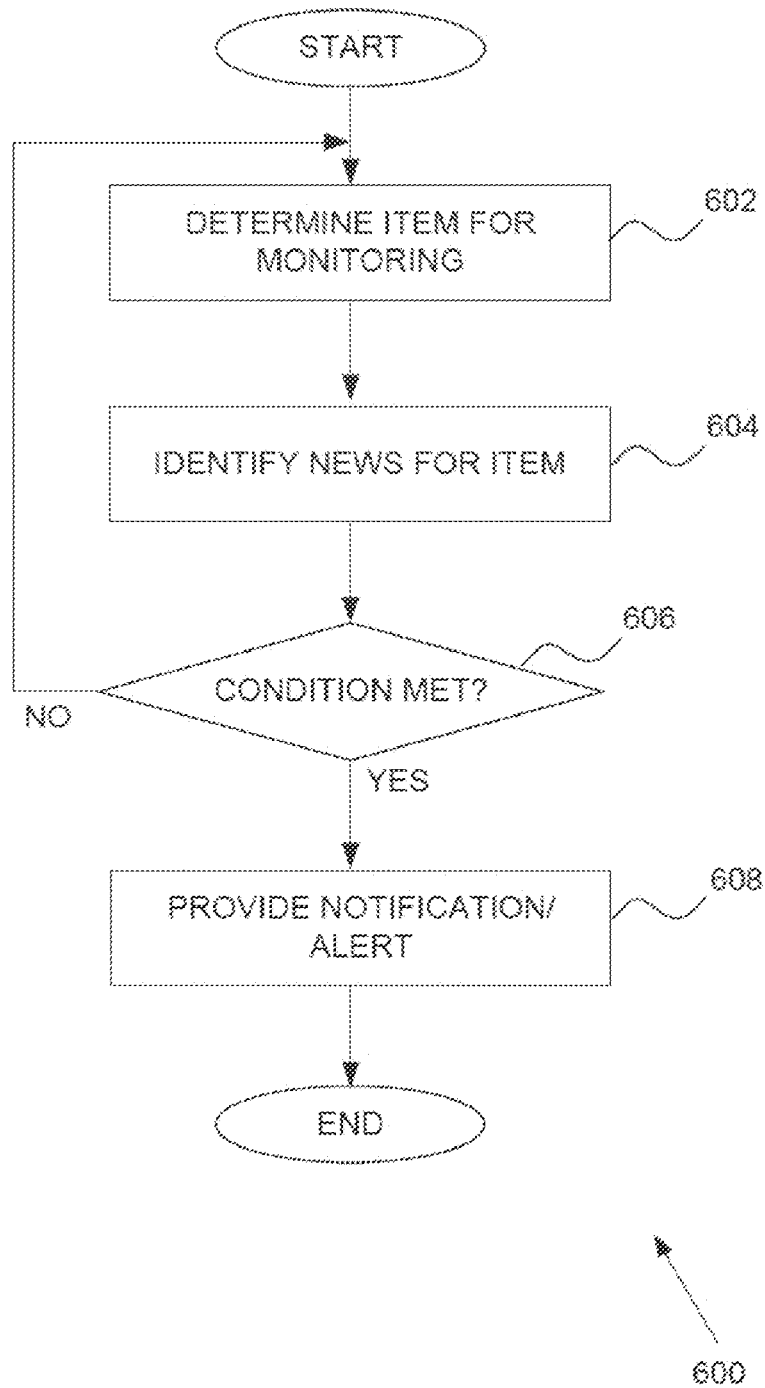
FIG. 6 is a flow diagram of an example high-level method for providing item notification.

FIG. 6 is a flow diagram of an example high-level method 600 for providing item notification. Item notifications may be provided when news regarding the item is available and the user has indicated their desire to receive such news. In example embodiments, a user may select an item from their inventory to monitor for news and provide conditions to trigger the monitoring and reporting of the news. In operation 602, the monitor module 310 determines the item for monitoring.

In operation 604, news for the selected item is identified. For example, the monitor module 310 may monitor the publication system 120 or the network at large for news regarding the selected item. The news may include upgrades available, plans for new versions or models of the selected item, new applications for the item, reported changes to the item, or any other information that may be determined to be relevant regarding the selected item. The news may be obtained by the monitor module 310 using various techniques such as, for example, using web searches or web crawlers. The monitoring may occur at predetermined intervals or occur based on a setting indicated by the user. In an alternative embodiment, information for an item may be pushed to the monitor module 310 from various data sources (e.g., a manufacturer or retailer of the item).

Once relevant information is identified, a determination is made in operation 606 as to whether conditions set by the user for reporting the news is met. In example embodiments, the user may establish conditions as to relevancy such that insignificant news may not be reported or is reported less frequently (e.g., insignificant news may be collected and provided once a week). The conditions may also indicate the type of information the user would like to be notified about (e.g., upgrades, new models, new applications for the item, new version, retiring piece, newly listed same item, selling of the same item).

If the condition is met by the news, then a notification or alert is provided by the notification module 312 in operation 608. Based on the notification, various options may be available to the user. In one example, the user may decide to upgrade their item by offering their item for sell or accessing a link (or perform a search to find retailers) to purchase an upgraded version of the item. In another example, the user may access a link or search for an upgrade patch for their item.

Figure 7:
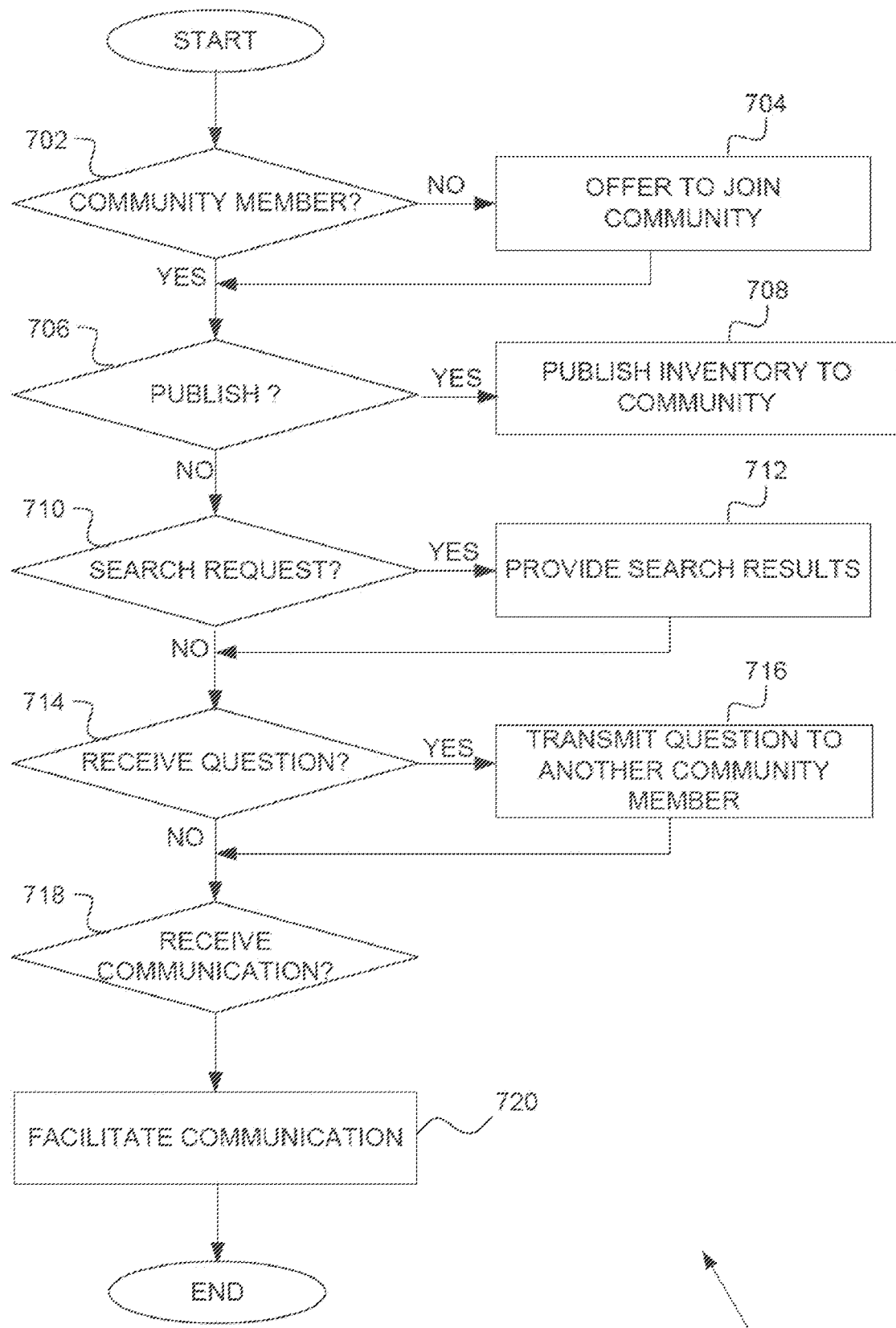
FIG. 7 is a flow diagram of an example high-level method for providing a community based on onboarded items.

FIG. 7 is a flow diagram of an example high-level method 700 for providing a community based on onboarded items. The operations of the method 700 may be performed by the communication module 314. The community may range from a small collection of users having the same or similar items to the network at large. In operation 702, a determination is made whether the user is a community member. In some cases, the user may need to be registered with the community in order to access information within the community. In other cases, the user may not need to be registered to access community information. However, by registering or identifying themselves to the community, the user's inventory information may be shared with other community members. In some embodiments, the community module 314 may verify a member login and password.

If the user is not a member, the user may be offered membership in operation 704. As discussed, the community may either require membership to access information, may just request the user identify themselves to the community (e.g., user identifier for the publication system 120 or just indicate that they are a guest), or have no requirement to be a member. Some communities may not even contemplate membership, but allow any user to share inventory information.

In operation 706, a determination is made as to whether the user's inventory information should be published to the community. If the user would like to share their inventory information, then the inventory information is published in operation 708. Publication of the inventory information to the community allows other members of the community to view, search, ask questions, and make offers to buy, trade, or sell items with the user based on their inventory information.

In operation 710, a determination is made as to whether a search request is received from the user. In some instances, the user may desire to search one or more inventory lists of other members of the community. In these cases, the community module 314 (or the navigation engine 212) receives the search request and performs a search of inventory information that is published within the community. For example, the user may want to find other members that have the same item as the user, or the user may want to find a member that may have an item that the user is missing and is trying to find. The search results may then be provided in operation 712.

In operation 714, a determination is made as to whether a question is received from the user. In some instances, the user may have a question for one or more users or members of the community. For example, the user may perform a search and be provided a search result in operation 712. Based on the search result, the user may determine another user (e.g., a user that has an item in their inventory list that was searched for), and ask that user a question regarding the item (e.g., how to maintain or fix the item). The question is transmitted to the other user in operation 716.

In operation 718, a determination is made as to whether a question or other communication is received for the user. In some cases, other users or members of the community may have a question for the user regarding their inventory information or provide other types of communications. If a communication is received by the community module 314, the communication may be forwarded to the user in order to facilitate communication between the two users in operation 720. The communication may, in various examples, be directed to a discussion regarding the item, an offer to buy or trade the item, or questions regarding the item. The communication may be facilitated by various means such as, for example, e-mail, text messaging, or a user interface provided by the publication system.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine Readable Medium

Figure 8:
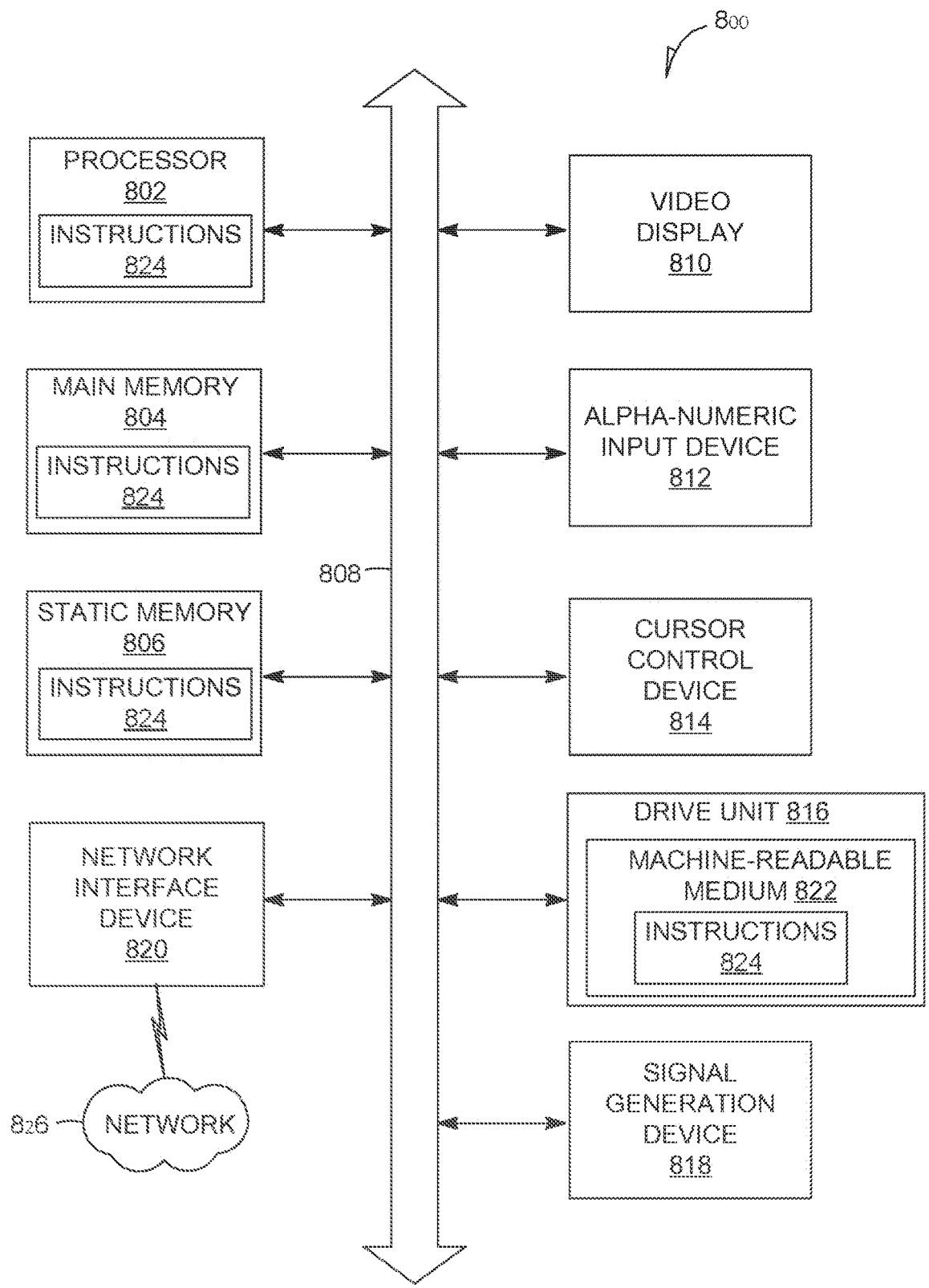
FIG. 8 is a simplified block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine Readable Storage Medium

The disk drive unit 816 includes a machine-readable storage medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, with the main memory 804 and the processor 802 also constituting machine-readable media.

While the machine-readable storage medium 822 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, from a device, an image depicting a plurality of items;
parsing the image to identify individual ones of the plurality of items;
based on identifying that one of the plurality of items matches two or more items in a catalog of items, transmitting, to the device, a notification that identifies the two or more items and requests input describing a correct match for the one of the plurality of items;
receiving, from the device, an indication of the correct match for the one of the plurality of items;
updating an inventory list associated with the device with information describing the one of the plurality of items responsive to receiving the indication of the correct match; and
automatically creating and publishing a listing via an online marketplace for the one of the plurality of items using the information.

2. The method of claim 1, wherein parsing the image to identify individual ones of the plurality of items comprises performing edge detection on the one of the plurality of items to determine at least one of an outline or a shape of the one of the plurality of items.

3. The method of claim 1, wherein parsing the image to identify individual ones of the plurality of items comprises identifying a feature of the one of the plurality of items, the feature comprising at least one of a name, a title, or a product number of the one of the plurality of items.

4. The method of claim 1, wherein parsing the image to identify individual ones of the plurality of items comprises performing at least one of optical character recognition, image recognition, text recognition, barcode identification, or pattern recognition on a portion of the image depicting the one of the plurality of items.

5. The method of claim 1, wherein identifying that the one of the plurality of items matches two or more items in a catalog of items comprises referencing a feature of the one of the plurality of items detected in the image with one or more features in the catalog of items.

6. The method of claim 1, further comprising monitoring for a change to the one of the plurality of items and transmitting a different notification to the device in response to detecting the change associated with the one of the plurality of items.

7. The method of claim 6, wherein detecting the change associated with the one of the plurality of items comprises detecting news regarding a different version or a different model of the one of the plurality of items.

8. The method of claim 6, wherein detecting the change associated with the one of the plurality of items comprises detecting publication of a listing for an item type associated with the one of the plurality of items.

9. The method of claim 6, wherein detecting the change associated with the one of the plurality of items comprises detecting a change in a pricing trend, a supply trend, a demand trend, or a popularity trend associated with the one of the plurality of items.

10. The method of claim 9, wherein detecting the change in the pricing trend, the supply trend, the demand trend, or the popularity trend is performed based on historical information that describes a historical trend for the one of the plurality of items during a period of time.

11. The method of claim 6, wherein the different notification includes a recommendation to generate a listing for sale of the one of the plurality of items based on the change associated with the one of the plurality of items.

12. A system comprising:
at least one processor; and
a storage device storing instructions that, when executed by the at least one processor, causes the at least one processor to perform operations comprising:
receiving, from a device, an image depicting a plurality of items;
parsing the image to identify individual ones of the plurality of items;
based on identifying that one of the plurality of items matches two or more items in a catalog of items, transmitting, to the device, a notification that identifies the two or more items and requests input describing a correct match for the one of the plurality of items;
receiving, from the device, an indication of the correct match for the one of the plurality of items;
updating an inventory list associated with the device with information describing the one of the plurality of items in response to receiving the indication of the correct match; and
automatically creating and publishing a listing via an online marketplace for the one of the plurality of items using the information.

13. The system of claim 12, wherein parsing the image to identify individual ones of the plurality of items comprises performing at least one of optical character recognition, image recognition, text recognition, barcode identification, or pattern recognition on a portion of the image depicting the one of the plurality of items.

14. The system of claim 12, wherein parsing the image to identify individual ones of the plurality of items comprises performing edge detection on the one of the plurality of items to determine at least one of an outline or a shape of the one of the plurality of items.

15. The system of claim 12, wherein identifying that the one of the plurality of items matches two or more items in a catalog of items comprises referencing a feature of the one of the plurality of items detected in the image with one or more features in the catalog of items.

16. The system of claim 12, the operations further comprising monitoring for a change to the one of the plurality of items and transmitting a different notification to the device in response to detecting the change associated with the one of the plurality of items.

17. The system of claim 16, wherein the different notification includes a recommendation to generate a listing for sale of the one of the plurality of items based on the change associated with the one of the plurality of items.

18. A non-transitory machine-readable storage medium storing instructions that are executed by at least one processor of a machine to perform operations comprising:
receiving, from a device, an image depicting a plurality of items;
parsing the image to identify individual ones of the plurality of items;
based on identifying that one of the plurality of items matches at least one item in a catalog of items, transmitting, to the device, a notification that identifies the at least one item and requests input describing a correct match for the one of the plurality of items;
receiving, from the device, an indication of the correct match for the one of the plurality of items;
responsive to receiving the indication of the correct match, updating an inventory list associated with the device using information describing the one of the plurality of items; and
automatically creating and publishing a listing via an online marketplace for the one of the plurality of items using the information.

* * * * *